United States Patent
Wu et al.

(10) Patent No.: US 12,054,654 B2
(45) Date of Patent: Aug. 6, 2024

(54) RE-WORKABLE ADHESIVES FOR ELECTRONIC DEVICES

(71) Applicant: Hewlett-Packard Development Company, L.P., Spring, TX (US)

(72) Inventors: Kuan-Ting Wu, Taipei (TW); Super Liao, Taipei (TW); Chung-Hua Ku, Taipei (TW)

(73) Assignee: Hewlett-Packard Development Company, L.P., Spring, TX (US)

( * ) Notice: Subject to any disclaimer, the term of this patent is extended or adjusted under 35 U.S.C. 154(b) by 249 days.

(21) Appl. No.: 17/424,002

(22) PCT Filed: May 15, 2019

(86) PCT No.: PCT/US2019/032357
§ 371 (c)(1),
(2) Date: Jul. 19, 2021

(87) PCT Pub. No.: WO2020/231417
PCT Pub. Date: Nov. 19, 2020

(65) Prior Publication Data
US 2022/0089913 A1    Mar. 24, 2022

(51) Int. Cl.
*C09J 7/35*    (2018.01)
*C09J 7/38*    (2018.01)

(52) U.S. Cl.
CPC .............. *C09J 7/35* (2018.01); *C09J 7/385* (2018.01); *C09J 2203/318* (2013.01);
(Continued)

(58) Field of Classification Search
CPC ........ C09J 7/35; C09J 7/385; C09J 2301/162; C09J 2301/302; C09J 2301/304;
(Continued)

(56) References Cited

U.S. PATENT DOCUMENTS

| 5,700,581 A | 12/1997 | Sachdev et al. |
| 6,380,322 B1 | 4/2002 | Wong et al. |

(Continued)

FOREIGN PATENT DOCUMENTS

| CN | 101083895 A | 12/2007 |
| CN | 107338021 A | 11/2017 |

(Continued)

OTHER PUBLICATIONS

CN-109837024_Jun. 2019_English Translation.*

*Primary Examiner* — Michael L Leonard
(74) *Attorney, Agent, or Firm* — Shook, Hardy & Bacon L.L.P.

(57) ABSTRACT

The present disclosure is drawn to re-workable adhesives for electronic devices. In one example, a re-workable adhesive for an electronic device can include a hot-melt adhesive present in an amount from about 60 wt % to about 90 wt % with respect to the total weight of the re-workable adhesive. The hot-melt adhesive can have a reduced bond strength at an elevated temperature. The re-workable adhesive can also include a pressure-sensitive adhesive present in an amount from about 10 wt % to about 40 wt % with respect to the total weight of the re-workable adhesive, wherein the pressure-sensitive adhesive has a higher bond strength compared to the hot-melt adhesive when at the elevated temperature.

14 Claims, 4 Drawing Sheets

(52) U.S. Cl.
CPC .... *C09J 2301/162* (2020.08); *C09J 2301/302* (2020.08); *C09J 2301/304* (2020.08); *C09J 2400/163* (2013.01); *C09J 2433/00* (2013.01); *C09J 2475/00* (2013.01); *C09J 2477/00* (2013.01)

(58) Field of Classification Search
CPC ............ C09J 2203/318; C09J 2400/163; C09J 2475/00; C09J 2477/00
See application file for complete search history.

(56) References Cited

U.S. PATENT DOCUMENTS

| | | | |
|---|---|---|---|
| 9,815,259 B2* | 11/2017 | Krogdahl | C09J 7/22 |
| 10,021,226 B2 | 7/2018 | Gagne-Keats et al. | |
| 2002/0135984 A1* | 9/2002 | Greenwood | H01L 23/4275 |
| | | | 361/720 |
| 2003/0170450 A1* | 9/2003 | Stewart | H05K 3/305 |
| | | | 428/347 |
| 2004/0241410 A1* | 12/2004 | Fischer | C09J 7/35 |
| | | | 428/292.1 |
| 2010/0148127 A1* | 6/2010 | Ellinger | C09J 123/142 |
| | | | 526/348 |
| 2011/0201717 A1 | 8/2011 | Held et al. | |
| 2012/0100326 A1 | 4/2012 | Sherman et al. | |
| 2016/0046845 A1 | 2/2016 | Das et al. | |
| 2019/0264068 A1* | 8/2019 | Sato | C08F 2/46 |

FOREIGN PATENT DOCUMENTS

| | | | | |
|---|---|---|---|---|
| CN | 109837024 | * | 6/2019 | ............... C09J 7/10 |
| WO | WO-2016069416 A1 | | 5/2016 | |

* cited by examiner

500 ⟶

| 510: gluing a display component onto a cover portion using a re-workable adhesive, wherein the re-workable adhesive includes: a hot-melt adhesive present in an amount from about 60 wt% to about 90 wt% with respect to the total weight of the re-workable adhesive, wherein the holt-melt adhesive has a reduced bond strength at an elevated temperature; and a pressure-sensitive adhesive present in an amount from about 10 wt% to about 40 wt% with respect to the total weight of the re-workable adhesive, wherein the pressure-sensitive adhesive has a higher bond strength compared to the hot-melt adhesive when at the elevated temperature |

FIG. 5

RE-WORKABLE ADHESIVES FOR ELECTRONIC DEVICES

BACKGROUND

The use of personal electronic devices of all types continues to increase. Cellular phones, including smartphones, have become nearly ubiquitous. Tablet computers have also become widely used in recent years. Portable laptop computers continue to be used by many for personal, entertainment, and business purposes. For portable electronic devices in particular, much effort has been expended to make these devices more useful and more powerful while at the same time making the devices smaller, lighter, and more durable. Electronic displays for these devices are constantly in development to increase display resolution, quality, and often display size. The aesthetic design of personal electronic devices is also of concern in this competitive market.

BRIEF DESCRIPTION OF THE DRAWING

FIG. 5 is a flowchart illustrating an example method of making an electronic device in accordance with examples of the present disclosure.

DETAILED DESCRIPTION

Figure 1A:
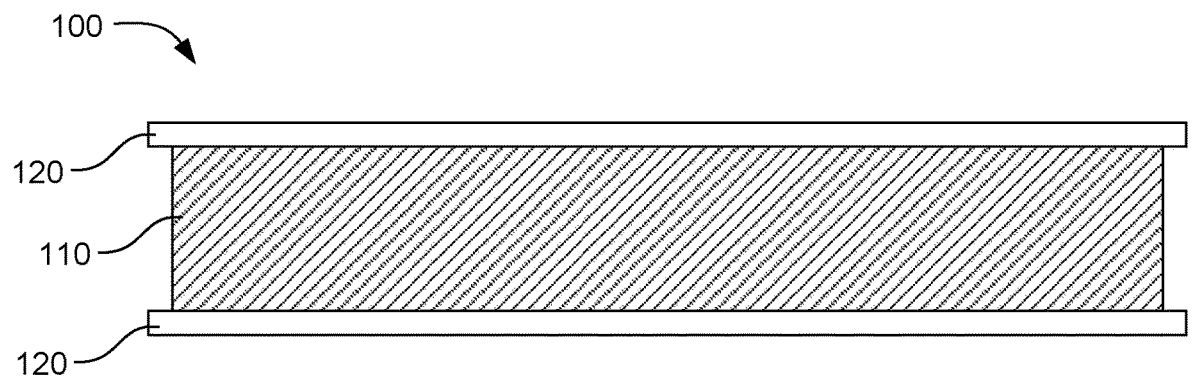
FIG. 1A is a cross-sectional view illustrating an example double sided tape including a re-workable adhesive for an electronic device in accordance with examples of the present disclosure.

The present disclosure describes re-workable adhesives that can be used in electronic devices. In one example, a re-workable adhesive for an electronic device can include a hot-melt adhesive present in an amount from about 60 wt % to about 90 wt % with respect to the total weight of the re-workable adhesive. The holt-melt adhesive can have a reduced bond strength at an elevated temperature. The re-workable adhesive can also include a pressure-sensitive adhesive present in an amount from about 10 wt % to about 40 wt % with respect to the total weight of the re-workable adhesive. The pressure-sensitive adhesive can have a higher bond strength compared to the hot-melt adhesive when at the elevated temperature. In some examples, the hot-melt adhesive can include an ethylene vinyl acetate adhesive, a polypropylene adhesive, a polyamide adhesive, a polyurethane adhesive, or a combination thereof. In other examples, the pressure-sensitive adhesive can include an epoxy adhesive, an acrylic adhesive, a polyurethane acrylate adhesive, a silicone-based adhesive, acrylic-based adhesive, natural rubber-based adhesive, styrene-butadiene rubber-based adhesive, styrenic block copolymer-based adhesive, or a combination thereof. In further examples, the hot-melt adhesive can be a polyurethane adhesive or a polyamide adhesive and the pressure-sensitive adhesive can be a polyurethane acrylate adhesive or an acrylic adhesive. In certain examples, the elevated temperature can be from about 60° C. to about 80° C. In another example, the adhesive can be removed from a surface by shear force at the elevated temperature. In further examples, the hot-melt adhesive can be a low-temperature hot-melt adhesive having a melting temperature from about 60° C. to about 150° C. In another example the re-workable adhesive can be in the form of a double-sided tape. In yet another example, the double-sided tape can include a layer of re-workable adhesive laminated between two removable release films.

The present disclosure also extends to electronic devices. In one example, an electronic device can include a cover portion, a display component, and a re-workable adhesive adhering the display component to the cover portion. The re-workable adhesive can include a hot-melt adhesive present in an amount from about 60 wt % to about 90 wt % with respect to the total weight of the re-workable adhesive. The holt-melt adhesive can have a reduced bond strength at an elevated temperature. The re-workable adhesive can also include a pressure-sensitive adhesive present in an amount from about 10 wt % to about 40 wt % with respect to the total weight of the re-workable adhesive. The pressure-sensitive adhesive can have a higher bond strength compared to the hot-melt adhesive when at the elevated temperature. In another example, the display component can be a liquid crystal display (LCD) panel or a light emitting diode (LED) lightbar. In yet another example, the cover portion can be a rear lid cover for a laptop display, a metal bracket, a light emitting diode (LED) housing, or a back reflector of a laptop display. In some examples, the cover portion can be made of metal.

The present disclosure also extends to methods of making electronic devices. In one example, a method of making an electronic device can include gluing a display component onto a cover portion using a re-workable adhesive. The re-workable adhesive can include a hot-melt adhesive present in an amount from about 60 wt % to about 90 wt % with respect to the total weight of the re-workable adhesive. The holt-melt adhesive can have a reduced bond strength at an elevated temperature. The re-workable adhesive can also include a pressure-sensitive adhesive present in an amount from about 10 wt % to about 40 wt % with respect to the total weight of the re-workable adhesive. The pressure-sensitive adhesive can have a higher bond strength compared to the hot-melt adhesive when at the elevated temperature. In further examples, the hot-melt adhesive can be a polyurethane adhesive or a polyamide adhesive and the pressure-sensitive adhesive can be a polyurethane acrylate adhesive or an acrylic adhesive, and the cover portion can be made of metal.

Re-workable Adhesives

The re-workable adhesives described herein can, in some examples, be used to glue together components of an electronic device. Research and development is often devoted to miniaturizing personal electronic devices and components thereof. In some cases, miniaturization can make it difficult to secure certain components together using fasteners such as screws or clips because of limited space for these fasteners. The re-workable adhesive described herein can be used to secure such components together and the adhesive can occupy less space in the electronic device compared to other types of fasteners. In a particular example, an electronic display for a device such as a laptop, tablet computer, or smartphone can have a narrow bezel. The bezel, or in other words the portion of the electronic device surrounding edges of the viewable display, is one subject of miniaturization efforts. In some cases, the bezel can be too narrow to fit screws or other fasteners to secure components such as a liquid crystal panel, a backlight unit, or other display components. Accordingly, in some examples, these components can be secured using the re-workable adhesive described herein when the bezel is too narrow for other types of fasteners.

The re-workable adhesives described herein can be described as "re-workable" because components adhered together using the adhesive can be separated and re-adhered multiple times. For example, a liquid crystal display panel that is secured with the re-workable adhesive can be removed and repositioned without adding additional adhesive. This can be useful when the electronic device is being initially assembled, when the electronic device is disassembled for repair, or when the liquid crystal panel is being replaced.

The adhesives described herein can include a combination of a hot-melt adhesive and a pressure-sensitive adhesive. As used herein, "hot-melt adhesives" are thermoplastic adhesives that are solid below a particular melting temperature, and which can melt to be applied as a liquid. Hot-melt adhesives can be applied at a high temperature above the melting point of the adhesive, and then allowed to cool. The hot-melt adhesive can provide a strong bond when cooled and solidified. In some cases, the hot-melt adhesive can lose bond strength when heated, and eventually can melt when heated above the melting point.

As used herein, "pressure-sensitive adhesive" refers to adhesives that form a bond when pressure is applied to bond the adhesive to a surface. Pressure-sensitive adhesives may not use solvents, water, or heat to activate the adhesive. This type of adhesive can be referred to as "self-adhesive" or "self-stick adhesive" in some cases. Some examples of pressure sensitive adhesives include adhesives used on self-adhesive tape, self-adhesive labels, and so on.

In one example, a re-workable adhesive for an electronic device can include a hot-melt adhesive and a pressure-sensitive adhesive. The hot-melt adhesive can be present in an amount from about 60 wt % to about 90 wt % with respect to the total weight of the re-workable adhesive. The hot-melt adhesive can have a reduced bond strength at an elevated temperature. The pressure-sensitive adhesive can be present in an amount from about 10 wt % to about 40 wt % with respect to the total weight of the re-workable adhesive. The pressure-sensitive adhesive can have a higher bond strength compared to the hot-melt adhesive when at the elevated temperature. Generally, the elevated temperature can be any temperature above room temperature or above the normal operating temperature of the electronic device. In one example, the elevated temperature can be from about 60° C. to about 80° C.

Figure 1B:
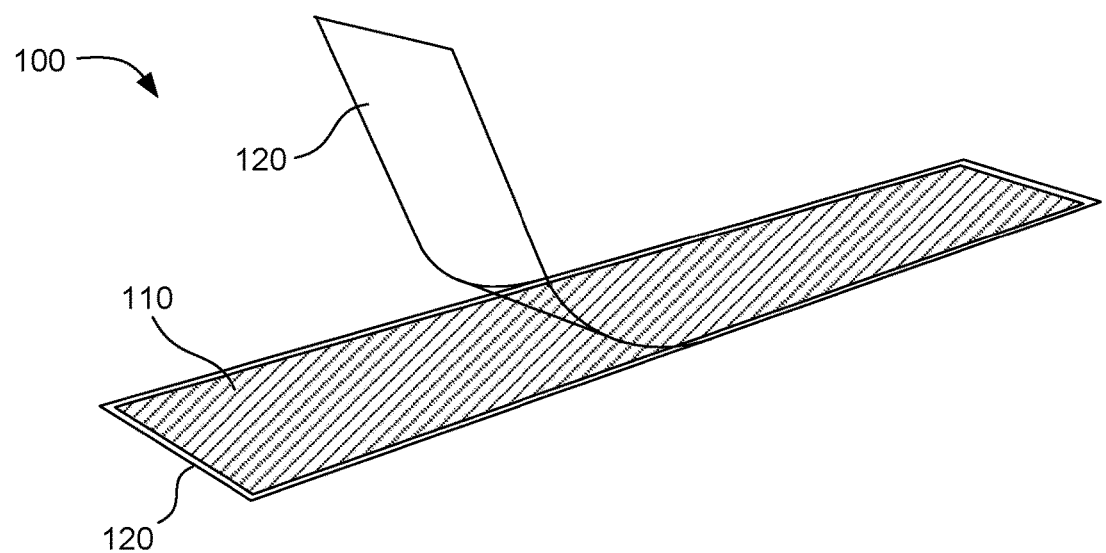
FIG. 1B is a perspective view of the example of FIG. 1A.

FIG. 1A shows one example in which the re-workable adhesive is in the form of a double sided tape 100. The double sided tape includes an adhesive layer 110 laminated between two removable release films 120. FIG. 1B shows how one of the release films can be removed from the adhesive layer. In some examples, one of the release films can be removed and then the tape can be adhered to one of the surfaces desired to be fixed together. The second release film can then be removed from the other side of the adhesive layer and a second surface can be adhered to the other side of the adhesive layer. In certain examples, the adhesive can be heated to the elevated temperature before being applied to the surfaces. In other examples, the adhesive can be adhered to one or both surfaces and then heated to the elevated temperature afterward. In some such examples, the heating the adhesive to the elevated temperature can increase the bond strength when the adhesive cools back to room temperature. This can be due to the hot-melt adhesive component of the re-workable adhesive. The hot-melt adhesive can tend to provide a stronger bond when heated before being applied to the surfaces and then subsequently cooled to room temperature, in some examples.

The hot-melt adhesive can include any type of hot-melt adhesive that can have a reduced bond strength at an elevated temperature. In some examples, the re-workable adhesive can be removed from an adhered surface by heating the adhesive to an elevated temperature to reduce the bond strength. The adhesive can then be separated from the adhered surface by applying shear force. The adhesive can then be repositioned, if desired, and re-adhered to the surface or adhered to a different surface. In some cases, the adhesive can be re-adhered to the surface while the adhesive is at the elevated temperature and then cooled to room temperature.

In certain examples, the hot-melt adhesive can include an ethylene vinyl acetate adhesive, a polypropylene adhesive, a polyamide adhesive, a polyurethane adhesive, or a combination thereof. In some examples, ethylene vinyl acetate adhesives can include an ethylene vinyl acetate copolymer. In a particular example, the vinyl acetate monomer can make up about 10 wt % to about 40 wt % of the copolymer, based on the total weight of the ethylene vinyl acetate copolymer itself. In further examples, the copolymer can include the vinyl acetate monomer in an amount from about 18 wt % to about 29 wt %. In addition to the ethylene vinyl acetate copolymer, the adhesive can also include a tackifier, a wax, a stabilizer, and other ingredients. In one such example, the hot-melt adhesive can include from about 20 wt % to about 60 wt % of an ethylene vinyl acetate copolymer, from about 20 wt % to about 50 wt % of a tackifier, from about 10 wt % to about 40 wt % of a wax, and from about 0.1 wt % to about 5 wt % of a stabilizer.

Polypropylene-based hot-melt adhesives can include polypropylene alone or with the addition of additives such as tackifiers, waxes, and stabilizers. In some examples, the polypropylene can be atactic polypropylene. In further examples, the polypropylene-based hot-melt adhesive can also include other polyolefins mixed with the polypropylene, such as polyethylene or polybutene. In certain examples, the polypropylene-based hot-melt adhesive can be made up of a mixture of polypropylene and other polyolefins alone, or with tackifiers, waxes, or stabilizers. In more specific examples, the polypropylene-based hot-melt adhesive can include from about 1 wt % to about 10 wt % tackifier, from about 1 wt % to about 10 wt % wax, and from about 0.1 wt % to about 5 wt % stabilizer.

In further examples, the hot-melt adhesive can include a polyamide-based hot-melt adhesive. In some such examples, the polyamide can be polymerized from a diamine and a dicarboxylic acid or diester. In certain examples, the dicarboxylic acid can be a dimerized fatty acid such as oleic acid. In further examples, the dicarboxylic acid can be present in an amount from about 60 wt % to about 80 wt % of the polyamide based on the total weight of the polymer. In more specific examples, the polyamide-based hot-melt adhesive can include from about 1 wt % to about 10 wt % tackifier, from about 1 wt % to about 10 wt % wax, and from about 0.1 wt % to about 5 wt % stabilizer In still further examples, the hot-melt adhesive can include a polyurethane-based adhesive. In certain examples, the polyurethane-based adhesive can include a thermoplastic polyurethane polymer. Thermoplastic polyurethanes can be made, in some examples, by polymerizing a diisocyanate with a polyol. In certain examples, the polyurethane-based hot-melt adhesive can also include from about 20 wt % to about 50 wt % of a tackifier, from about 10 wt % to about 40 wt % of a wax, and from about 0.1 wt % to about 5 wt % of a stabilizer.

As mentioned above, the re-workable adhesive can include a mixture of a hot melt adhesive and a pressure-sensitive adhesive. In some examples, the pressure-sensitive adhesive can be manufactured in a fully solid form or with a liquid carrier that can be evaporated to produce a solid adhesive. In certain examples, the pressure-sensitive adhesive can be crosslinked. For example, the pressure-sensitive adhesive can be made using a low viscosity polymer that can be coated to make the desired form of the adhesive and then the low viscosity polymer can be crosslinked to increase the molecular weight of the polymer. In other examples, the pressure-sensitive adhesive can be made using a high viscosity polymer that is heated to reduce viscosity and then coated on a surface to produce the desired form of the adhesive. In various examples, the polymer used in the pressure-sensitive adhesive can be an elastomer such as an epoxy, a polyurethane acrylate, a silicone, an acrylic, a natural rubber, a styrene-butadiene rubber, a styrenic block copolymer, or combination thereof. In addition to the polymer, pressure-sensitive adhesives can include additives such as tackifiers, waxes, plasticizers, stabilizers, and others. In further examples, the pressure-sensitive adhesive can be a removable pressure-sensitive adhesive. In still further examples, the pressure-sensitive adhesive can have a maximum working temperature from about 60° C. to about 200° C.

In certain examples, the pressure-sensitive adhesive can include a polyurethane acrylate polymer. Polyurethane acrylate polymers can be polymerized from polyisocyanate monomers, polyol monomers, and acrylate monomers. In certain examples, a polyisocyanate can react with a polyol to yield an isocyanate terminated urethane. This can then be reacted with a hydroxyl terminate acrylate monomer attach acrylate groups to the terminal isocyanate groups of the urethane. The acrylate groups can then be further polymerized through free radical polymerization. In various examples, the polyol used to make the polyurethane acrylate polymer can include a polyester polyol, a polyether polyol, or others.

In still further examples, the pressure-sensitive adhesive can include a pressure-sensitive acrylic adhesive. Acrylic adhesive can include polymers formed by polymerizing monomers such as acrylic acid, methacrylic acid, hydroxyl ethyl acrylate, 2-ethylhexyl acrylate, butyl acrylate, isooctyl acrylate, methyl acrylate, ethyl acrylate, vinyl acetate, methyl methacrylate, t-butyl acrylate, t-butyl methacrylate, isobornyl acrylate, isobornyl methacrylate, or combinations thereof.

Tackifiers that can be included in the adhesives can include a resin such as a natural resin or a synthetic resin. In some examples, the tackifier can include a rosin, a rosin derivative, a terpene, a modified terpene, a terpene-phenol resin, an aliphatic resin, a cycloaliphatic resin, an aromatic resin, cumarone-indene resin, alpha-methylstyrene resin, vinyl toluene resin, or a combination thereof.

Waxes can be included in the adhesives in some examples. In hot-melt adhesives, the wax can lower the surface tension of the melted adhesive and decrease the melt viscosity of the adhesive. In some examples, the wax can include a microcrystalline wax, a paraffin, carnauba wax, montan wax, polyethylene wax, polypropylene wax, polytetrafluoroethylene wax, Fischer-Tropsch wax, or a combination thereof.

Stabilizers used in the adhesives can include ultraviolet stabilizers and antioxidants. Non-limiting examples of stabilizers can include hindered phenols, butylate hydroxytoluene, phosphites, phosphates, hindered aromatic amines, thioesters, benzophenone, hydroxyphenylbenzotriazoles, decanedioic acid, bis(2,2,6,6-tetramethyl-1-(oxtyloxy)-4-piperidinyl)ester, 2-(2H-benzotriazol-2-yl)-4,6-bis(1-methyl-1-phenylethyl)phenol, 2-(5-chloro(2H)-benzotriazole-2-yl)-4-(methyl)-6-(tert-butyl)phenol, tris(mono-nonylphenyl) phosphite, 2,5'-di(tertamyl)hydroquinone, 4,4'dioctyl diphenylamine, 2',3-bis(3-(3,5-di-tert-butyl-4-hydroxyphenyl) propionyl) propionohydrazide, 2,6-di-tert-butyl-4-(4,6-bis (octylthio)-1,3,5-triazin-2-ylamino)phenol, 4,6-Bis (dodecylthiomethyl)-o-cresol, 2,6-Di-t-butyl-4-[4,6-bis (octylthio)-1,3,5-triazin-2-ylamino]phenol, 2, 2'-Methanobi (4-methyl-6-tert butyl phenol), Octadecyl-3-(3,5-di-tert.butyl-4-hydroxyphenyl)propionate, 1,2-Bis(3,5-di-tert-butyl-4-hydroxyhydrocinnamoly), 4,4-bis (alpha, alpha-dimethyl benzyl) diphenylamine, and combinations thereof.

Other additives that can be included in the adhesives can include plasticizers, pigments, dyes, biocides, flame retardants, antistatic agents, fillers, and combinations thereof.

Electronic Devices

The present disclosure also extends to electronic devices that can incorporate the re-workable adhesives described herein. In one example, an electronic device can include a cover portion, a display component, and a re-workable adhesive adhering the display component to the cover portion. The re-workable adhesive can include a hot-melt adhesive in an amount from about 60 wt % to about 90 wt % with respect to the total weight of the re-workable adhesive. The hot-melt adhesive can have a reduced bond strength at an elevated temperature. The re-workable adhesive can also include a pressure-sensitive adhesive in an amount from about 10 wt % to about 40 wt % with respect to the total weight of the re-workable adhesive. The pressure-sensitive adhesive can have a higher bond strength compared to the hot-melt adhesive when at the elevated temperature.

Figure 2:
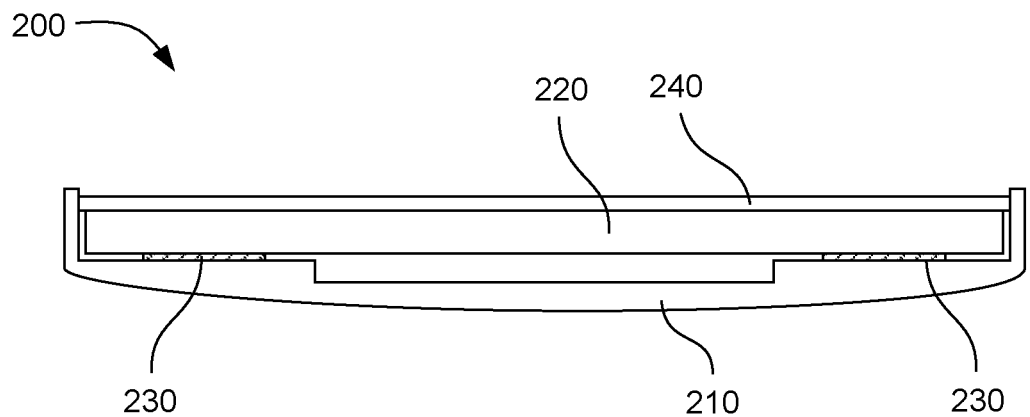
FIG. 2 is a cross-sectional view illustrating an example electronic device in accordance with examples of the present disclosure.

FIG. 2 shows a cross-sectional view of an example electronic device 200. This example includes a cover portion 210 and a liquid crystal module 220, which is an example display component. The liquid crystal module can include various components of a liquid crystal display, such as a backlight unit, a thin-film transistor (TFT) array, a liquid crystal panel, light guides, touch sensor, and so on. The liquid crystal module is adhered to the cover portion with a re-workable adhesive 230. Also in this example, a glass panel 240 is placed in front of the liquid crystal module.

In various examples, the cover portion can be an external cover of an electronic device or an internal component of the electronic device that can provide structural support for the display component adhered thereto. As used herein, "external cover" refers to the exterior shell of an electronic device. In other words, the external cover contains the internal electronic components of the electronic device. The cover is an integral part of the electronic device. The term "cover" is not meant to refer to the type of removable protective cases that are often purchased separately from an electronic device (especially smartphones and tablets) and placed around the exterior of the electronic device. Covers as described herein can be used on a variety of electronic devices. For example, laptop computers, smartphones, tablet computers, and other electronic devices can include the covers described herein. In various examples, these covers can be formed by molding, casting, machining, bending, working, stamping, or another process. In some examples, the cover portion can be made of metal. In one example, a metal cover can be milled from a single block of metal. In other examples, the cover can be made from multiple panels. For example, laptop covers sometimes include four separate cover pieces forming the complete cover of the laptop. The four separate pieces of the laptop cover are often designated as cover A (back cover of the monitor portion of the laptop), cover B (front cover of the monitor portion), cover C (top cover of the keyboard portion) and cover D (bottom cover of the keyboard portion). Covers can also be made for smartphones and tablet computers with a single metal piece or multiple metal panels.

Internal components that can provide structural support can include internal chassis components, internal housings for various components such as LED housings, back reflectors, brackets for attaching internal components together, and others. Any such component can be the "cover portion" described herein and the display component described herein can be adhered to the cover portion using the re-workable adhesive.

The display component can include any display component that is desired to be fixed in place in the electronic device. In some examples, the display components can include a liquid crystal module, as previously described and shown in FIG. 2. In more specific terms, the display component may be a liquid crystal panel, an organic light emitting diode (OLED) panel, a backlight unit, a back reflector, an LED light bar, an LED housing, a light guide, a tough sensor, a liquid crystal panel, a glass panel, or others.

Figure 3:
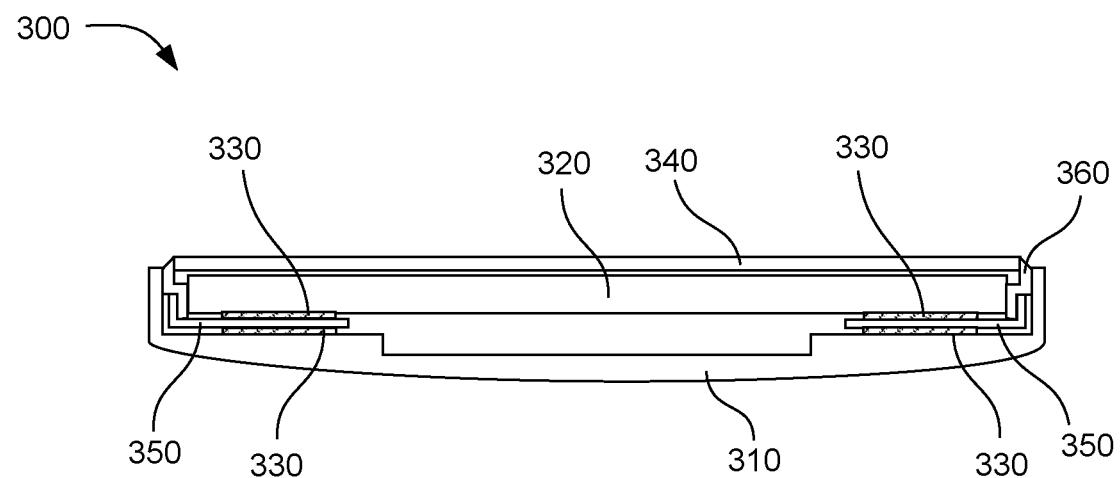
FIG. 3 is a cross-sectional view illustrating another example electronic device in accordance with examples of the present disclosure.

FIG. 3 shows a cross-sectional view of another example electronic device 300, which can also include a liquid crystal module 320, for example. In this example, a case portion 310 is adhered directly to metal brackets 350 using re-workable adhesive 330. Additional re-workable adhesive is used to adhere a liquid crystal module to the other side of the metal brackets. The metal brackets also hold the liquid crystal module in place relative to an outer frame 360 that holds a glass panel 340. As shown in this example, the re-workable adhesive can be used in multiple locations to secure multiple components together in the electronic device.

Figure 4:
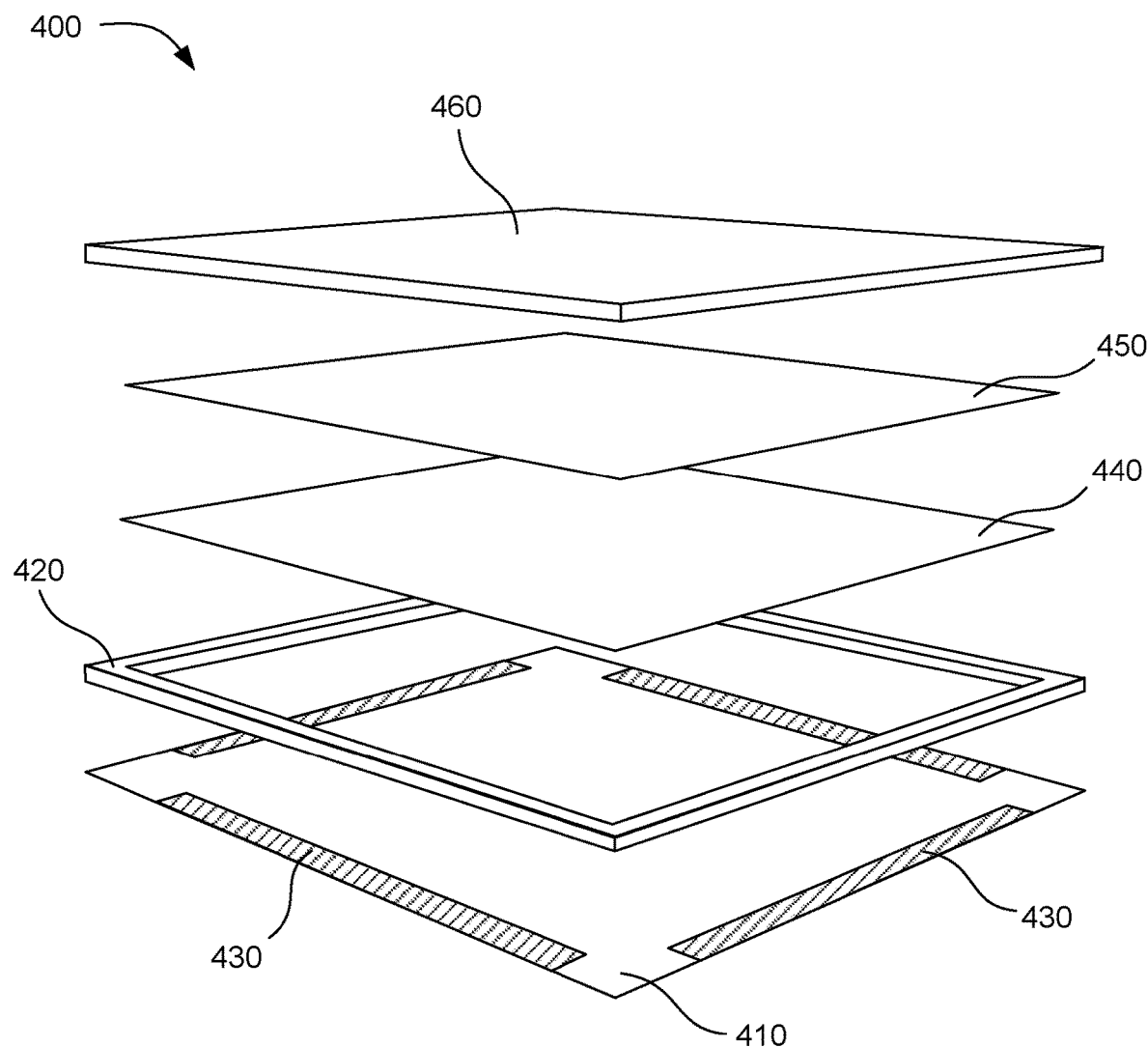
FIG. 4 is an exploded view illustrating yet another example electronic device in accordance with examples of the present disclosure.

FIG. 4 shows an exploded view of another example electronic device 400. This example includes a back reflector 410 as the cover portion and a LED housing 420 as the display component to be adhered together. Re-workable adhesive 430 is placed on the back reflector to adhere the LED housing to the back reflector. This example also includes a light guide 440, a diffusing film 450, and a liquid crystal panel 460 that can be assembled together with the LED housing and the back reflector to form the electronic device. Although not shown in this example, the re-workable adhesive can also be used to adhere the liquid crystal panel to the LED housing, or to secure any of the other components.

Methods of Making Electronic Devices

The present disclosure also extends to methods of making electronic devices. In some examples, such methods can include securing a cover portion of the device to a display portion of the device using a re-workable adhesive as described herein. As mentioned above, a variety of different components in the electronic device can be adhered together using the re-workable adhesive. A single electronic device can include multiple different components secured together using re-workable adhesive in a variety of combinations.

FIG. 5 is a flowchart illustration one example method 500 of making an electronic device. The method includes gluing 510 a display component onto a cover portion using a re-workable adhesive, wherein the re-workable adhesive includes: a hot-melt adhesive present in an amount from about 60 wt % to about 90 wt % with respect to the total weight of the re-workable adhesive, wherein the holt-melt adhesive has a reduced bond strength at an elevated temperature; and a pressure-sensitive adhesive present in an amount from about 10 wt % to about 40 wt % with respect to the total weight of the re-workable adhesive, wherein the pressure-sensitive adhesive has a higher bond strength compared to the hot-melt adhesive when at the elevated temperature.

Any of the re-workable adhesive compositions described above can be used in the methods of making electronic devices described herein. In a certain example, the re-workable adhesive can include a polyurethane adhesive or a polyamide adhesive as the hot-melt adhesive, and a polyurethane acrylate adhesive as the pressure-sensitive adhesive. In another certain examples, the cover portion of the electronic device can be made of metal.

Definitions

It is noted that, as used in this specification and the appended claims, the singular forms "a," "an," and "the" include plural referents unless the content clearly dictates otherwise.

The term "about" as used herein, when referring to a numerical value or range, allows for a degree of variability in the value or range, for example, within 5% or other reasonable added range breadth of a stated value or of a stated limit of a range. The term "about" when modifying a numerical range is also understood to include the exact numerical value indicated, e.g., the range of about 1 wt % to about 5 wt % includes 1 wt % to 5 wt % as an explicitly supported sub-range.

As used herein, "bond strength" of adhesives refers generally to the force exerted to separate to surfaces that are bonded together with the adhesives. In one example, the bond strength can specifically be the 90 degree peel resistance of the adhesive. This property can be measured using the ASTM D6862 Standard Test Method for 90 Degree Peel Resistance of Adhesives.

As used herein, a plurality of items, structural elements, compositional elements, and/or materials may be presented in a common list for convenience. However, these lists should be construed as though the individual members of the list are individually identified as a separate and unique member. Thus, no individual member of such list should be construed as a de facto equivalent of any other member of the same list solely based on their presentation in a common group without indications to the contrary.

Concentrations, dimensions, amounts, and other numerical data may be presented herein in a range format. It is to be understood that such range format is used merely for convenience and brevity and should be interpreted flexibly to include the numerical values explicitly recited as the limits of the range, and also to include all the individual numerical values or sub-ranges encompassed within that range as if individual numerical values and sub-ranges are explicitly recited. For example, a layer thickness from about 0.1 µm to about 0.5 µm should be interpreted to include the explicitly recited limits of 0.1 µm to 0.5 µm, and to include thicknesses such as about 0.1 µm and about 0.5 µm, as well as subranges such as about 0.2 µm to about 0.4 µm, about 0.2 µm to about 0.5 µm, about 0.1 µm to about 0.4 µm etc.

The following illustrates an example of the present disclosure. However, it is to be understood that the following is illustrative of the application of the principles of the present disclosure. Numerous modifications and alternative compositions, methods, and systems may be devised without departing from the spirit and scope of the present disclosure. The appended claims are intended to cover such modifications and arrangements.

Example—Making an Electronic Device

An example electronic device is made as follows:
1) A re-workable adhesive is formulated by mixing 10 wt % acrylic pressure-sensitive adhesive with 90 wt % polyamide hot-melt adhesive in a molten state.
2) The re-workable adhesive is applied to a "laptop cover A," or the back cover of the monitor portion of a laptop.
3) A liquid crystal module is adhered to the cover by pressing the liquid crystal module onto the re-workable adhesive at a temperature of about 80° C. and then cooling the re-workable adhesive.
4) A laptop cover B, or the front bezel of the monitor portion, is then attached over the liquid crystal module.

What is claimed is:

1. A re-workable adhesive for an electronic device, comprising:
a hot-melt adhesive present in an amount of from about 60 wt % to about 90 wt % with respect to the total weight of the re-workable adhesive, wherein the hot-melt adhesive has a melting temperature from about 60° C. to about 125° C., and wherein the holt-melt adhesive has a reduced bond strength at an elevated temperature; and
a pressure-sensitive adhesive mixed with the hot-melt adhesive and present in an amount of from about 10 wt % to about 40 wt % with respect to the total weight of the re-workable adhesive, wherein the pressure-sensitive adhesive has a higher bond strength compared to the hot-melt adhesive when at the elevated temperature.

2. The re-workable adhesive of claim 1, wherein the hot-melt adhesive is selected from the group consisting of an ethylene vinyl acetate adhesive, a polypropylene adhesive, a polyamide adhesive, a polyurethane adhesive, and a combination thereof.

3. The re-workable adhesive of claim 1, wherein the pressure-sensitive adhesive is selected from the group consisting of an epoxy adhesive, an acrylic adhesive, a polyurethane acrylate adhesive, a silicone-based adhesive, a natural rubber-based adhesive, a styrene-butadiene rubber-based adhesive, a styrenic block copolymer-based adhesive, and a combination thereof.

4. The re-workable adhesive of claim 2, wherein when the hot-melt adhesive is an ethylene vinyl acetate adhesive, the ethylene vinyl acetate adhesive comprises an ethylene vinyl acetate copolymer having a vinyl acetate monomer that is present in an amount from about 18 wt % to about 29 wt % with respect to the total weight of the ethylene vinyl acetate copolymer.

5. The re-workable adhesive of claim 2, wherein when the hot-melt adhesive is a polyamide adhesive, the polyamide adhesive comprises a polymerized dicarboxylic acid present in an amount of from about 60 wt % to 80% with respect to the total weight of the polyamide adhesive.

6. The re-workable adhesive of claim 2, wherein the hot-melt adhesive is a polypropylene adhesive, the polypropylene adhesive comprises a mixture of polypropylene and at least one additional polyolefin.

7. The re-workable adhesive of claim 2, wherein when the hot-melt adhesive is a polyurethane adhesive, the polyurethane adhesive comprises amounts from about 20 wt % to about 50 wt % of a tackifier, from about 10 wt % to about 40 wt % of a wax, and from about 0.1 wt % to about 5 wt % of a stabilizer, with respect to the total weight of the polyurethane adhesive.

8. The re-workable adhesive of claim 3, wherein when the pressure-sensitive adhesive is a polyurethane acrylate polymer, the polyurethane acrylate polymer is polymerized from one or more of a polyisocyanate monomer, a polyol monomer, or an acrylate monomer.

9. The re-workable adhesive of claim 3, wherein when the pressure-sensitive adhesive is an acrylic adhesive, the acrylic adhesive includes polymers formed by polymerizing monomers selected from the group consisting of: acrylic acid, methacrylic acid, hydroxyl ethyl acrylate, 2-ethylhexyl acrylate, butyl acrylate, isooctyl acrylate, methyl acrylate, ethyl acrylate, vinyl acetate, methyl methacrylate, t-butyl acrylate, t-butyl methacrylate, isobornyl acrylate, isobornyl methacrylate, or a combination thereof.

10. An electronic device, comprising:
a cover portion;
a display component; and
a re-workable adhesive adhering the display component to the cover portion, wherein the re-workable adhesive comprises:
a hot-melt adhesive present in an amount of from about 60 wt % to about 90 wt % with respect to the total weight of the re-workable adhesive, wherein the hot-melt adhesive has a melting temperature from about 60° C. to about 125° C., and wherein the holt-melt adhesive has a reduced bond strength at an elevated temperature; and
a pressure-sensitive adhesive mixed with the hot-melt adhesive and present in an amount of from about 10 wt % to about 40 wt % with respect to the total weight of the re-workable adhesive, wherein the pressure-sensitive adhesive has a higher bond strength compared to the hot-melt adhesive when at the elevated temperature.

11. The electronic device of claim 10, wherein the display component is a liquid crystal display (LCD) panel or a light emitting diode (LED) lightbar.

12. The electronic device of claim 10, wherein the cover portion is a rear lid cover for a laptop display, a metal bracket, a light emitting diode (LED) housing, or a back reflector of a laptop display.

13. The electronic device of claim 10, wherein the cover portion is made of metal.

14. A method of making an electronic device, comprising:
gluing a display component onto a cover portion using a re-workable adhesive, wherein the re-workable adhesive comprises:
a hot-melt adhesive present in an amount of from about 60 wt % to about 90 wt % with respect to the total weight of the re-workable adhesive, wherein the hot-melt adhesive has a melting temperature from about 60° C. to about 125° C., and wherein the holt-melt adhesive has a reduced bond strength at an elevated temperature; and
a pressure-sensitive adhesive mixed with the hot-melt adhesive and present in an amount of from about 10 wt % to about 40 wt % with respect to the total weight of the re-workable adhesive, wherein the pressure-sensitive adhesive has a higher bond strength compared to the hot-melt adhesive when at the elevated temperature.

* * * * *